United States Patent
Wu et al.

(10) Patent No.: US 10,920,894 B2
(45) Date of Patent: Feb. 16, 2021

(54) FLOW CONTROL DEVICE AND METHOD FOR MANUFACTURING THE SAME

(71) Applicant: Hangzhou Sanhua Research Institute Co., Ltd., Zhejiang (CN)

(72) Inventors: Zhi Wu, Zhejiang (CN); Huayuan Jiang, Zhejiang (CN); Yumin Yu, Zhejiang (CN)

(73) Assignee: Hangzhou Sanhua Research Institute Co., Ltd., Zhejiang (CN)

(*) Notice: Subject to any disclaimer, the term of this patent is extended or adjusted under 35 U.S.C. 154(b) by 84 days.

(21) Appl. No.: 16/307,866

(22) PCT Filed: Jun. 8, 2017

(86) PCT No.: PCT/CN2017/087525
§ 371 (c)(1),
(2) Date: Dec. 6, 2018

(87) PCT Pub. No.: WO2017/211311
PCT Pub. Date: Dec. 14, 2017

(65) Prior Publication Data
US 2019/0301619 A1 Oct. 3, 2019

(30) Foreign Application Priority Data

Jun. 8, 2016 (CN) .................. 201610405390.X
Jun. 8, 2016 (CN) .................. 201610407226.2
Jun. 8, 2016 (CN) .................. 201610408005.7

(51) Int. Cl.
*F16K 11/074* (2006.01)
*B23P 15/00* (2006.01)
(Continued)

(52) U.S. Cl.
CPC .......... *F16K 11/074* (2013.01); *B23P 15/001* (2013.01); *F16K 3/314* (2013.01); *F16K 27/045* (2013.01)

(58) Field of Classification Search
CPC ...... F16K 11/074; F16K 3/314; F16K 27/045; F16K 11/0746; B23P 15/001; Y10T 137/86533
(Continued)

(56) References Cited

U.S. PATENT DOCUMENTS

| 6,050,285 A * | 4/2000 | Goncze ............ G05D 16/065 137/315.05 |
| 2015/0233476 A1* | 8/2015 | Bachofer ............ F16K 31/041 251/319 |
| 2015/0233482 A1 | 8/2015 | Bachofer |

FOREIGN PATENT DOCUMENTS

| CN | 200955608 | 10/2007 |
| CN | 201992128 | 9/2011 |

(Continued)

OTHER PUBLICATIONS

International Search Report for International Application No. PCT/CN2017/087525, dated Aug. 27, 2017.
(Continued)

*Primary Examiner* — Michael R Reid
(74) *Attorney, Agent, or Firm* — Wolf, Greenfield & Sacks, P.C.

(57) ABSTRACT

A flow control device used in a vehicle heat exchange system and a method for manufacturing the same are provided. The flow control device includes a housing and a valve body assembly. The valve body assembly comprises a first valve plate, a second valve plate, and a transmission n part. The housing has an accommodating portion and a protruding limiter, in which the protruding limiter circumferentially limits the first valve plate, a lower side surface of (Continued)

the second valve plate (22) is disposed opposite to the protruding limiter, and at least a part of the lower side surface of the second valve plate is in contact with the first valve plate. The transmission part drives the second valve plate to open or close the circulating valve port of the first valve plate and/or adjust the opening degree of the circulating valve port, such that the product sealing performance can be improved.

17 Claims, 6 Drawing Sheets

(51) Int. Cl.
    *F16K 3/314*     (2006.01)
    *F16K 27/04*     (2006.01)

(58) Field of Classification Search
    USPC ............................................ 137/625.15
    See application file for complete search history.

(56) References Cited

FOREIGN PATENT DOCUMENTS

| | | |
|---|---|---|
| CN | 104653816 | 5/2015 |
| CN | 104728471 | 6/2015 |
| DE | 3633483 | 4/1988 |
| GB | 2 292 206 | 2/1996 |
| JP | H07-260023 A | 10/1995 |
| WO | WO-2014072376 A1 * | 5/2014 ............. F16J 15/447 |

OTHER PUBLICATIONS

Extended European Search Report for European Application No. 17809750.7, dated Apr. 22, 2020.
Written Opinion for International Application No. PCT/CN2017/087525, dated Aug. 24, 2017.
International Preliminary Report on Patentability for International Application No. PCT/CN2017/087525, dated Dec. 20, 2018.
PCT/CN2017/087525, Aug. 24, 2017, Written Opinion.
PCT/CN2017/087525, Dec. 20, 2018, International Preliminary Report on Patentability.
EP17809750.7, Apr. 22, 2020, Extended European Search Report.

* cited by examiner

FLOW CONTROL DEVICE AND METHOD FOR MANUFACTURING THE SAME

This application is a national stage filing under 35 U.S.C. § 371 of international application number PCT/CN2017/087525, filed on Jun. 8, 2017, and claims priority the priorities to Chinese patent application No. 201610405390.X, titled "FLOW RATE CONTROL DEVICE", priority to Chinese patent application No. 201610407226.2, titled "FLOW RATE CONTROL DEVICE", and priority to Chinese patent application No. 201610408005.7, titled "FLOW RATE CONTROL DEVICE AND MANUFACTURING METHOD FOR THE SAME", filed with the Chinese State Intellectual Property Office on Jun. 8, 2016. The entire contents of these applications are incorporated herein by reference in its entirety.

FIELD

The present application relates to flow rate control devices in the field of heat exchange.

BACKGROUND

A thermal management system for an electric vehicle includes a cooling liquid circulation system. The cooling liquid circulation system includes a thermal converter, power electronics, a drive motor, a vehicle-mounted charger, a water storage kettle, an electric water pump, a reversing valve, a heat-radiating tank high-temperature zone, a high-voltage positive temperature coefficient (PTC) device and an air-condition radiator. A reversing device is connected circularly with a pipeline, and may be used for converting a flow direction of the cooling liquid. For example, a PTC heating device is added in a hybrid electric vehicle, so as to make up for the shortage of insufficient residual heat, and it may be required to switch the cooling liquid to flow to the PTC heating device, and in the process of switching the PTC heating device, it is also required to use the reversing valve to switch the flow direction of the cooling liquid.

At present, the cooling liquid reversing device has a very wide range of applications in hybrid and pure electric vehicle industries, for example, a motor-driven piston valve. The piston valve has a valve body assembly mounted in its valve body, and the valve body assembly is connected to a speed reduction gear mechanism by a valve body shaft, and the speed reduction gear mechanism is driven by a motor to drive the valve body assembly to perform reciprocal linear movement to change the sealing position. However, a sealing ring used in the piston valve is made of a rubber material and is apt to be excessively deformed or damaged when being pressed by the movable valve body. Therefore, after long-term use, the sealing performance of the flow path of the cooling liquid is extremely apt to be degraded, and internal leakage of the piston valve may be caused. The piston can continue to be used only after new sealing rings are replaced, which may affect the use.

SUMMARY

An object of the present application is to provide a flow rate control device capable of realizing flow rate distribution and improving internal sealing performance.

To achieve the above object, the flow rate control device according to the present application adopts the following technical solution. A flow rate control device includes a housing and a valve body assembly. The housing has a mounting chamber, at least one inlet and at least one outlet, the valve body assembly is at least partially accommodated in the mounting chamber, and the valve body assembly includes a first valve plate, a second valve and a transmission part. The housing has a position-limiting protrusion and an accommodating portion at a bottom side of the mounting chamber, the first valve plate is at least partially located at the accommodating portion, the position-limiting protrusion is capable of limiting the position of the first valve plate in a circumferential direction, a lower surface of the second valve plate is arranged at least partially opposite to the position-limiting protrusion, and the lower surface of the second valve plate is in surface contact with an upper surface of the first valve plate so as to be arranged in a sealed manner. The housing has at least one opening at the bottom side of the mounting chamber, the at least one opening is in communication with the outlet, the first valve plate has at least one flow valve port corresponding to and in communication with the opening of the housing, the second valve plate is relatively securely connected to the transmission part, and driven by the transmission part, the second valve plate is opened to open and close the flow valve port of the first valve plate and/or regulate the opening degree of the flow valve port.

Compared with the conventional technology, the present application provides the first valve plate that cooperates with the position-limiting protrusion, and the second valve plate which is movable relative to the first valve plate, thereby can achieve proportional flow rate regulation, and the first valve plate and the second valve plate are arranged to be sealed against each other, thereby can improve the internal sealing performance of the flow control device.

An object of the present application is further to provide a flow rate control device that can improve the movement control performance of the transmission part and has a better internal sealing performance.

To achieve the above object, the flow rate control device according to the present application adopts the following technical solution. A flow rate control device, includes a housing, a valve body assembly and a control component. The housing has a mounting chamber, an inlet, at least one outlet, the valve body assembly includes a first valve plate, a second valve plate, and a transmission part, the first valve plate and the second valve plate are accommodated in the mounting chamber, a lower side of the second valve plate is in direct contact with the first valve plate. One end of the transmission part forms a first transmission portion, the first transmission portion is assembled and secured to an upper side of the second valve plate, the upper side of the second valve plate has a fixing recess configured to accommodate the first transmission portion, and another end of the transmission part forms a second transmission portion, and the second transmission portion is arranged to extend outward of the housing. The flow rate control device further includes an adapter, and the adapter has one end assembled and secured to the second transmission portion, and another end assembled and secured to a transmission output portion of the control component.

Compared with the conventional technology, the present application provides the adapter to assemble with the transmission part and the transmission output portion of the control part so as to achieve relative fixation, thereby can improve the movement control performance of the transmission part, and the first valve plate and the second valve plate are arranged to be sealed against each other, thereby can improve the sealing performance of the product.

An object of the present application is further to provide a flow rate control device that can achieve proportional flow rate distribution and improve the internal sealing performance.

To achieve the above object, the flow rate control device according to the present application adopts the following technical solution. A flow rate control device includes at least a housing, a valve body assembly and a control component. The housing includes a distribution main body, a cover body, a first pipeline and a second pipeline, the first pipeline and the second pipeline are connected to the distribution main body, and the first pipeline and the second pipeline are arranged to be sealed against the distribution main body. The distribution main body comprises a mounting chamber and at least one opening located at a bottom side of the mounting chamber, one of the first pipeline and the second pipeline is an inlet pipeline, and the other is an outlet pipeline. The outlet pipeline is connected to and communicates with the opening of the housing. The valve body assembly is at least partially accommodated in the mounting chamber, and the valve body assembly includes a first valve plate, a second valve plate and a transmission part. The housing has a position-limiting protrusion located at a bottom side of the mounting chamber, and the mounting chamber includes an accommodating recess located on one side of the position-limiting protrusion, the first valve plate is located in the accommodating recess, the first valve plate and the position-limiting protrusion are substantially complementarily arranged, thereby the first valve plate is relatively securely positioned relative to the position-limiting protrusion, a lower surface of the second valve plate is arranged opposite to the position-limiting protrusion, and the lower surface of the second valve plate is in direct contact with the first valve plate. The first valve plate has at least one flow valve port, and the at least one flow valve port corresponds to and communicates with the at least one opening, and the second valve plate is relatively securely connected to the transmission part, and driven by the transmission part, the second valve plate opens and closes the flow valve port of the first valve plate, or regulates the opening degree of the flow valve port.

A manufacturing method for a flow rate control device is further disclosed according to the present application. The manufacturing method includes the following steps.

providing a distribution main body and a cover body which are formed by injection molding, assembling the distribution main body and the cover body by threaded connection, or welded connection or rivet connection, specifically, the distribution main body is integrally formed with an inlet pipeline, at least one outlet pipeline, or the distribution main body is integrally formed with a first connection pipe and a second connection pipe, and in this case, providing an inlet pipeline and at least one outlet pipeline which are formed by injection molding, and arranging the first connection pipe of the distribution main body and the inlet pipeline in a sealed manner, and arranging the second connection pipe of the distribution main body and the outlet pipeline in a sealed manner;

providing a valve body assembly including a transmission part formed by injection molding with a plastic, a first valve plate and a second valve plate which are made of ceramic or metal, fixing by assembling the first valve plate to a position-limiting protrusion integrally formed with the distribution main body, and fixing by assembling the second valve plate to the transmission part;

providing a control component, assembling the control component, by providing a shell, to the housing by a threaded connection or a welded connection or a rivet connection, specifically, the control component is integrally formed with an external fixation frame, the external fixation frame includes a fixation hole and a shockproof ring locked inside the fixation hole.

Compared with the conventional technology, the flow control device provided by the above manufacturing method according to the present application can achieve proportional flow rate regulation by providing the second valve plate movable relative to the first valve plate. Further, in the flow rate control device provided by the above manufacturing method according to the present application, the sealing performance between the inlet pipe, the first outlet pipeline and the distribution main body is good, and the first valve plate and the second valve plate are also arranged to be sealed against each other, thereby can improve the internal sealing performance of the product.

DETAILED DESCRIPTION OF EMBODIMENTS

Figure 1:
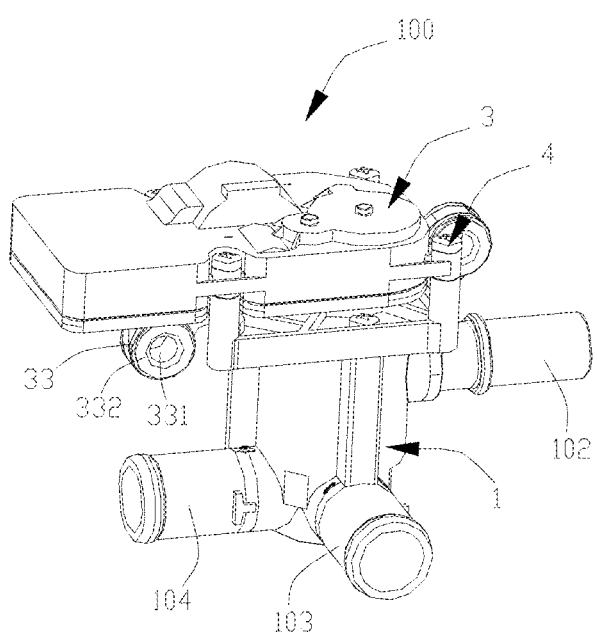
FIG. 1 is a schematic perspective view of an embodiment of a flow rate control device in an assembled state.

Reference is made to FIGS. 1 to 5, a flow rate control device 100 may be applied to a heat exchange system, such as a vehicle air conditioning system or a home air conditioning system. Specifically, a flowing medium controlled by the flow rate control device may be water, a mixture liquid of water and other liquids, or other cooling liquids having a capability of heat transmission. The flow rate control device controls the distribution of the flowing medium to allow the flowing medium to exchange heat with other working mediums of the heat exchange system, and then regulates the distribution to the medium outlet flow rate of the flow rate control device to control the flowing medium in the flow path of the heat exchange system and thereby can improve and optimize the performance in controlling the flow path of the heat exchange system.

The flow rate control device 100 can be used for new energy automotive air conditioners such as heating, ventilating and air conditioning, battery cooling, or battery heating systems. Through the arrangement of the multi-way structure of the flow rate control device, the flow rate control device distributes in proportion the working medium coming from the same inlet to different outlets. The flow rate control device can be located in two or more heat exchange system circuits, and can combine with the heat exchange system to perform flow path switching, and can realize proportional distribution of flow rates of the working medium flowing in different flow paths of the heat exchange system.

The flow rate control device includes a housing 1, a valve body assembly 2 and a control component 3. The housing includes a distribution main body 11 and a cover body 12. The distribution main body has a mounting chamber 101, and one end of the mounting chamber 101 is a mounting opening, specifically, the mounting opening can be defined as an upper port of the distribution main body. The valve body assembly 2 is disposed into the mounting chamber 101 from the mounting opening, and is at least partially accommodated in the mounting chamber. Further, the distribution main body 11 is assembled with the cover body 12. Specifically, the distribution main body 11 and the cover body 12 are each provided with a screw mounting hole, and can be assembled together by a screw element 4 so as to be relatively securely arranged. The housing 1 and the control component 3 are also assembled together and secured by threaded connection.

Figure 6:
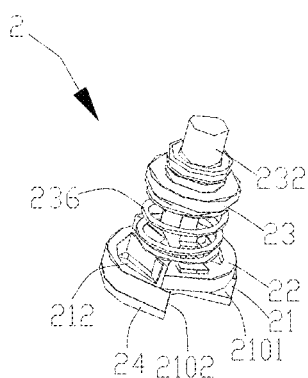
FIG. 6 is a schematic perspective view showing the valve body component of the flow rate control device in FIG. 2 in an assembled state.
Figure 7:
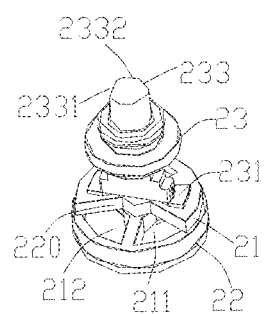
FIG. 7 is a schematic perspective view of the assembled valve body component in FIG. 6 viewed from another angle.
Figure 8:
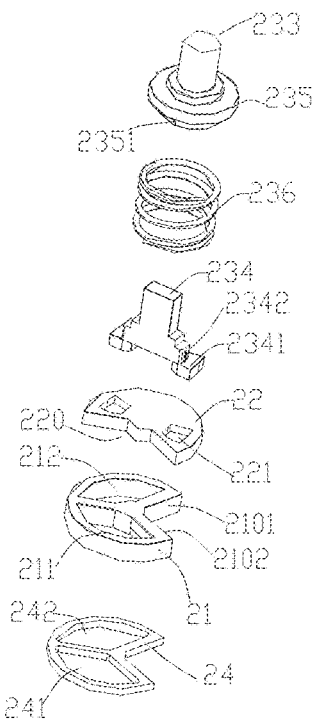
FIG. 8 is a perspective exploded view of the valve body component in FIG. 6.
Figure 9:
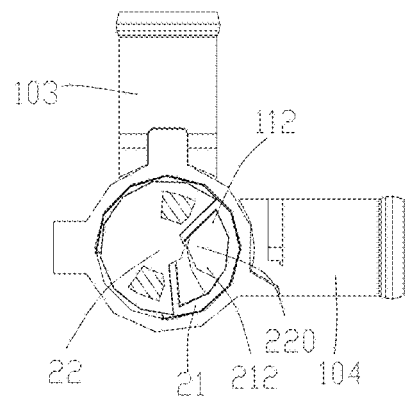
FIG. 9 is a perspective top view showing the distribution main body in FIG. 4 assembled with a first valve plate and a second valve plate.
Figure 10:
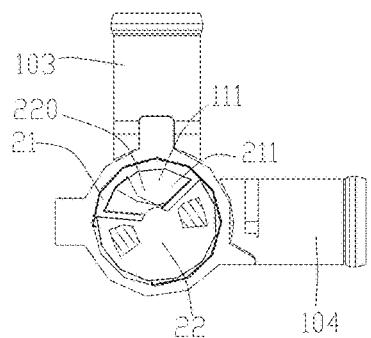
FIG. 10 is a perspective top view showing the assembled distribution main body and the first valve plate and the second valve plate in FIG. 9 viewed from another angle.

The housing 1 has at least one inlet and at least one outlet. In this embodiment, the housing 1 has a first pipeline, a second pipeline and a third pipeline. The first pipeline is an inlet pipeline 102. The second pipeline is a first outlet pipeline 103, and the third pipeline is a second outlet pipeline 104, such that the housing 1 has an inlet, a first outlet and a second outlet, thus forming a three way structure including one inlet and two outlets. Specifically, the distribution main body 11 combines with the cover body 12 to form the mounting chamber 101. The inlet, the first outlet and the second outlet can be fitted with connecting pipelines in the heat exchange system circuits where they are located. Specifically, the inlet pipeline 102, the first outlet pipeline 103 and the second outlet pipeline 104 of the housing and the distribution main body may be an integrally connected structure. With reference to FIG. 6 to FIG. 8, the valve body assembly 2 is at least partially accommodated in the mounting chamber 101, and the valve body assembly 2 includes a first valve plate 21, a second valve plate 22 and a transmission part 23. The housing 1 has a position-limiting protrusion 13 and an accommodating portion 1011 located on the bottom side of the mounting chamber. Specifically, each of the position-limiting protrusion and the accommodating portion 1011 has a fan-shaped outer contour. The accommodating portion and the position-limiting protrusion are complementarily arranged in the housing. The "complementary arrangement" is defined herein in view of the bottom region of the housing, the accommodating portion occupies one part of the bottom region, and the position-limiting protrusion occupies the other part of the bottom region, and particularly in a top view, the accommodating portion and the position-limiting protrusion are complementarily arranged within the range of the bottom region in the housing. The first valve plate 21 is at least partially located in the accommodating portion 1011, and the position-limiting protrusion 13 can limit the position of the first valve plate in a circumferential direction such that the first valve plate 21 is relatively securely arranged relative to the housing. The definition "relatively secured arrangement" here means that the first valve plate can move within an allowable range. The first valve plate 21 is located in the accommodating portion 1011 so as to be arranged also substantially complementary to the position-limiting protrusion 13. Corresponding to the position-limiting protrusion, the first valve plate 21 is configured in a fan shape substantially, such configuration can reduce the volume of the first valve plate, reduce the material cost, and a lower surface of the first valve plate is in direct contact with the housing so as to be arranged in a sealed manner or a sealing member is additionally provided for sealing the first valve plate against the housing. For the convenience of description, an upper surface of the first valve plate is in contact with the second valve plate, the lower surface of the first valve plate is arranged opposite to the upper surface thereof. A lower surface of the second valve plate is in contact with the first valve plate, and an upper surface of the second valve plate is arranged opposite to the lower surface of the second valve plate. The direction perpendicular to the first valve plate 21 and the second valve plate is defined here as a vertical direction. Specifically, the vertical direction is perpendicular to the planes where the first valve plate and the second valve plate are located, that is, the vertical direction is just a central axis direction about which the second valve plate rotates, and may also be understood as an axial direction of the mounting chamber or an axial direction of the transmission part. The lower surface of the first valve plate 21 is lower than an upper surface 131 of the position-limiting protrusion 13. The upper surface of the first valve plate is higher than or flush with the upper surface of the position-limiting protrusion 13, and the lower surface of the second valve plate is arranged at least partially opposite to the upper surface of the position-limiting protrusion. In the vertical direction, a clearance is presented between the lower surface of the second valve plate and the upper surface of the position-limiting protrusion, and the clearance is not greater than the thickness dimension of the first valve plate. Specifically, the thickness dimension of the first valve plate ranges from 3 mm to 9 mm, such as 4 mm, 5 mm, 6 mm, 7 mm. If the first valve plate is too thin, it will be not easy to manufacture and has a poor structural strength. If the first valve plate is too thick, it will relatively increase the overall height dimension of the product, which is not conducive to miniaturization and will relatively increase raw material costs.

A first block portion 132 and a second block portion 133 are respectively formed on both sides of the position-limiting protrusion 13. The first block portion and the second block portion are formed at edge of regions on both sides of the position-limiting protrusion. The side edges are arranged to intersect with the upper surface 131 of the position-limiting protrusion, and the first block portion and/or the second block portion are configured to be arranged opposite to side edges of the first valve plate. The first valve plate 21 has a first abutment portion 2101 and a second abutment portion 2102. For the first valve plate, the first valve plate has a main body portion with a fan-shaped profile, the main body portion includes an arc-shaped portion. The arc-shaped portion and the first abutment portion and the second abutment portion are configured in a fan shape. The first abutment portion 2101 is arranged opposite to the first block portion 132, and the second abutment portion 2102 is arranged opposite to the second block portion 133, such that the first block portion and the second block portion can limit the position of the first valve plate in a circumferential direction. Specifically, a clearance is allowed to be presented between the first valve plate 21 and the position-limiting protrusion, that is, the first valve plate 21 and the housing are in a clearance fit. A clearance less than 2 mm is presented between the first abutment portion 2101 and the first block portion 132 of the position-limiting protrusion, and/or, a clearance less than 2 mm is presented between the second abutment portion 2102 and the second block portion 133. The first valve plate 21 and the position-limiting protrusion 13 of the housing are embodied to be in the above clearance fit at the two sides, such that the first valve plate 21 is easy to be mounted in the housing without adversely affecting the sealing performance between first valve plate and the second valve plate.

The lower surface of the second valve plate 22 is arranged at least partially opposite to the upper surface 131 of the position-limiting protrusion, and in the vertical direction, the lower surface of the second valve plate 22 and the upper surface 131 of the position-limiting protrusion are arranged at least partially opposite to each other. A clearance is presented between the lower surface of the second valve plate and the upper surface 131 of the position-limiting protrusion, and the clearance is less than 0.8 mm. With such an arrangement, the friction resistance subjected by the second valve plate during rotation relative to the first valve plate can be reduced, thus ensuring the movability of the second valve plate. In addition, the upper surface 131 of the position-limiting protrusion 13 forms a substantially fan-shaped position-limiting surface. When the first valve plate 21 is subjected to a downward pressure exerted by the second valve plate or a downward pressure exerted by the flowing medium, the upper surface of the position-limiting protrusion can provide position-limiting when necessary, which is favorable for improving the stability of movements of the second valve plate. The lower surface of the second valve plate 22 rotates reciprocally along the upper surface of the first valve plate, that is, the second valve plate is a movable valve plate, and with respect to the second valve plate, the first valve plate serves as a relatively secured valve plate. The second valve plate performs a rotating movement along the upper surface of the first valve plate. This movement mode of reciprocating rotation can reduce the space required for the movement stroke while ensuring the opening and closing of the flow valve port compared with a linear reciprocating movement mode, which is advantageous to product volume reduction. The lower surface of the second valve plate 22 has a roughness less than or equal to the roughness of the upper surface of the second valve plate. The upper surface of the first valve plate 21 has a roughness less than or equal to the roughness of the lower surface of the first valve plate. The upper surface of the first valve plate and the lower surface of the second valve plate serve as rubbing contact surface, and the roughness requirement is relatively high. After multiple times of design and repeated tests, the surface roughness of the upper surface of the first valve plate is greater than 0.03 µm and less than 0.5 µm, and/or the surface roughness of the lower surface of the second valve plate is greater than 0.03 µm and less than 0.5 µm, such as a surface roughness of 0.03 µm, 0.04 µm, 0.05 µm, 0.06 µm, 0.07 µm, 0.08 µm, 0.09 µm, 0.1 µm, 0.2 µm, 0.3 µm, 0.4 µm, 0.45 µm, 0.485 µm, or any other values within the above range, thus may ensure the sealing performance between the first valve plate and the second valve plate, for example, may internally seal the liquid flowing medium, to prevent internal leakage from adversely affecting the performance in controlling the flowing medium. In contrast, the lower surface of the first valve plate and the upper surface of the second valve plate serve as non-rubbing surfaces, and the requirements upon roughness is low, so as to reduce manufacturing costs.

The first valve plate and the second valve plate are ceramic valve plates or metal valve plates, such that each valve plate has a high wear resistance, a high melting point, a high hardness, and is not apt to be oxidized at high temperatures, for example, the ceramic valve plates, and has a good anti-corrosion capability against acid, alkali and salt. Therefore, when used repeatedly at different temperatures for a long time, the ceramic valve plate or the metal valve plate can maintain a good sealing effect, and are not apt to occur an aging phenomenon compared with a rubber material, thereby can guarantee the performance of the flow rate control device. Further, the first valve plate and the second valve plate are respectively used as a lower valve plate and an upper valve plate, and are each configured in a fan shape, and the contact area of their opposite contact surfaces is small, which can reduce the friction therebetween and reduce the requirements on torque of the motor, prevent the flow rate control device from being unable to move due to the excessive friction and also facilitate the reduction of costs and overall weight of the product.

The distribution main body 11 of the housing 1 has at least one opening located at a bottom side of the mounting chamber, the at least one opening is in communication with the at least one outlet. The first valve plate 21 has at least one flow valve port corresponding to and in communication with the opening of the housing. The second valve plate 22 includes a fan-shaped opening 220. When the fan-shaped opening is partially aligned with the flow valve port portion of the first valve plate and put the valve into conduction, one of the outlets can be opened. The second valve plate 22 is relatively securely connected to the transmission part 23. The control component 3 of the flow rate control device can provide a driving force. The driving force drives the transmission part 23 to move, and the transmission part 23 drives the second valve plate 22. An upper end of the transmission part 23 is mechanically connected to the control component, and the upper end is sealed against the housing 1. The upper surface of the first valve plate is in contact with the lower surface of the second valve plate. Driven by the transmission part 23, the second valve plate 22 opens and closes the flow valve port of the first valve plate, and/or regulates the opening degree of the flow valve port. In addition, in the vertical direction, the lower surface of the second valve plate 22 is arranged opposite to the upper surface of the position-limiting protrusion 13, and the lower surface of the second valve plate 22 is in contact with the upper surface of the first valve plate, such that the working medium of the flow control valve flows through the flow valve port to prevent the working medium from leaking via the clearance between the first valve plate and the second valve plate.

Referring to FIGS. 4 to 10, the opening of the housing includes a first opening 111 and a second opening 112 at the bottom side of the mounting chamber. The first outlet of the housing is in communication with the first opening. The second outlet is in communication with the second opening. The flow valve port of the first valve plate 21 includes a first flow port 211 corresponding to and in communication with the first opening and a second flow port 212 corresponding to and in communication with the second opening. Specifically, the first valve plate has a partition. The partition is integrally connected to an inner side of the fan-shaped main body portion. The first flow port 211 and the second flow port 212 are formed at both sides of the partition, thereby the flow rate control device has a flow channel via which the inlet pipeline 102 is in communication with at least one of the first outlet pipeline and the second outlet pipeline. Driven by the transmission part 23, the second valve plate 22 can open the first flow port 211 and/or the second flow port 212 of the first valve plate 21, such that the fan-shaped opening 220 of the second valve plate is in communication with the first flow port 211 and/or the second flow port 212. By opening the first flow port 211, the inlet pipeline and the first outlet pipeline of the housing are enabled to be in communication. By opening the second flow port 212, the inlet pipeline and the second outlet pipeline are enabled to be in communication. The transmission part 23 is capable of controlling the second valve plate to make a rotating movement, thereby regulating the proportions of flow rates distributed to the first outlet pipeline and the second outlet pipeline from the inlet pipeline. Specifically, when the first flow port and the second flow port are both opened at the same time, if the opening degree of the first flow port 211 increases, the opening degree of the second flow port 212 decreases, or if the opening degree of the second flow port 212 increases, the opening degree of the first flow port 211 decreases.

Figure 2:
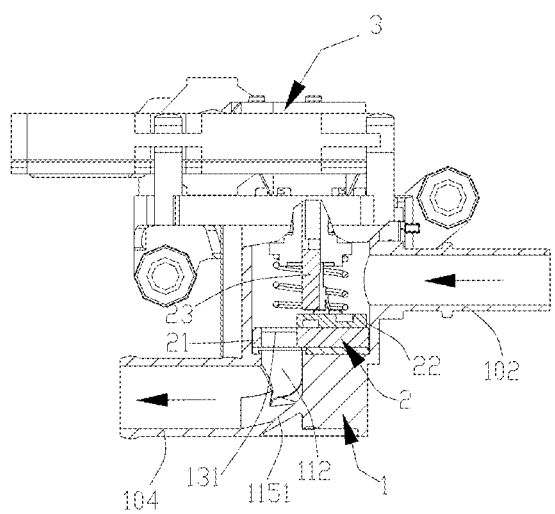
FIG. 2 is a perspective partially sectional view of the flow rate control device in FIG. 1, and schematically shows the relationship between a valve body component and a housing of the flow rate control device in assembling.

In addition, as shown in FIG. 2, the distribution main body 11 of the housing 1 comprises a dividing portion 113, a first distribution chamber 114 and a second distribution chamber 115. The dividing portion 113 is configured to integrally extend from the bottom side of the housing, and is integrally connected to the position-limiting protrusion 13. The first distribution chamber 114 and the second distribution chamber 115 are respectively located at both sides of the dividing portion 113. The first opening 111 of the housing is in communication with the first distribution chamber 114, and the second opening 112 is in communication with the second distribution chamber 115, such that the working medium can be distributed from the first opening and the second opening into the first distribution chamber and the second distribution chamber corresponding thereto respectively. Further, a bottom side of the first distribution chamber 114 comprises a first flow guiding portion 1141. The first flow guiding portion has an arc-shaped connection surface connected to a side wall surface of the dividing portion, and/or a bottom side of the second distribution chamber 115 comprises a second flow guiding portion 1151. The second flow guiding portion has an arc-shaped connection surface connected to another side wall surface of the dividing portion, which can guide the working medium to pass smoothly and reduce the fluid resistance as much as possible.

Specifically, the second valve plate 22 moves between the first position and the second position relative to the first valve plate. Thus, when the second valve plate 22 is in the first position, the second valve plate opens the first flow port 211 such that the first outlet pipeline 103 is conducted, and closes the second flow port 212 such that the second outlet pipeline 104 is cut off. When the second valve plate 22 is in the second position, the second valve plate opens the second flow port 212 such that the second outlet pipeline 104 is conducted, and closes the first flow port 211 such that the first outlet pipeline 103 is cut off. Further, during the movement of the second valve plate 22, when the second valve plate 22 moves to the first position, the first flow port 211 is opened to a maximum opening degree and the opening degree of the second flow port 212 is zero, in this case, the flow area of the first flow port reaches the maximum, and the flow area of the second flow port reaches the minimum. When the second valve plate 22 reaches a second position, the opening degree of the first flow port 211 is zero and the second flow port 212 is opened to a maximum opening degree, in this case, the flow area of the first flow port reaches the minimum, and the flow area of the second flow port reaches the maximum. When the second valve plate 22 moves to a position between the first position and the second position, both the first flow port 211 and the second flow port 212 are opened. The sum of the opening degree of the first flow port 211 and the opening degree of the second flow port 212 is equal to the maximum opening degree of the first flow port or the maximum opening degree of the second flow port, that is, the sum of the flow areas of the first flow port and the second flow port is equal to the maximum flow area of any one of the first flow port and the second flow port, such that the flow rate control device can realize the proportional distribution of the working medium. Moreover, the first valve plate and second valve plate are arranged to be sealed against each other, which can significantly improve the sealing performance of the product and prevent the leakage of the working medium from the clearance between the first valve plate and the second valve plate. The first opening 111 and the second opening 112 of the housing are each configured in a fan shape or a crescent shape or a kidney shape, and correspondingly, the first flow port 211 and the second flow port 212 are fan-shaped, crescent-shaped or kidney-shaped. As the flow areas of the first flow port and the second flow port of the second valve plate increase or decrease, the flow rate of the working medium gradually increases or decreases. Thus, in the process of closing or opening the flow valve port, the valve opening characteristics and the valve closing characteristics can be better maintained relatively consistent with each other. Thus, when the system is running, regulating the flow rate of the system may be performed more stably.

The flow rate control device further includes a sealing member 24 which has substantially an overall fan shape. The sealing member is located in the accommodating portion 1011, and the sealing member is arranged to correspond to the first valve plate 21. The sealing member and the first valve plate 21 are located at a region complementary to the position-limiting protrusion 13. Specifically, the sealing member and the first valve plate 21 are arranged in the accommodating portion 1011. The sealing member 24 comprises a first through hole 241 and a second through hole 242. Each of the first through hole 241 and the second through hole 242 is arranged in a fan shape or a crescent shape or a kidney shape. The first through hole 241 is arranged to correspond to the first opening 111 of the housing, and the second through hole 242 is arranged to correspond to the second opening 112 of the housing. Alternatively, the first through hole 241 is arranged to correspond to the first flow port 211 of the first valve plate, and the second through hole 242 is arranged to correspond to the second flow port 212 of the first valve plate to facilitate the smooth passage of the working medium and reduce fluid resistance. The sealing member 24 abuts against the bottom wall of the housing 1 and the first valve plate 21 respectively. The sealing member 24 is in contact with the lower surface of the first valve plate 21 and is in contact with the housing, so as to perform sealing. In a vertical direction perpendicular to the first valve plate, the sealing member is sandwiched between the lower surface of the first valve plate and the housing. The housing has a positioning groove 1012 for accommodating the sealing member. The positioning groove is arranged to correspond to the sealing member 24, to prevent the working medium from leaking through a clearance between the housing and the first valve plate.

Figure 3:
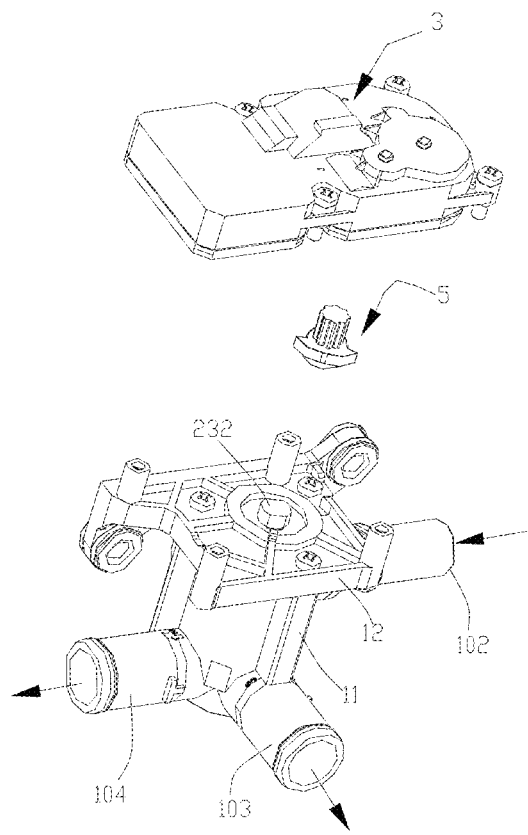
FIG. 3 is a perspective partially exploded view of the flow rate control device in FIG. 1, and schematically shows the relationship between the housing and a control component of the flow rate control device in assembling.
Figure 4:
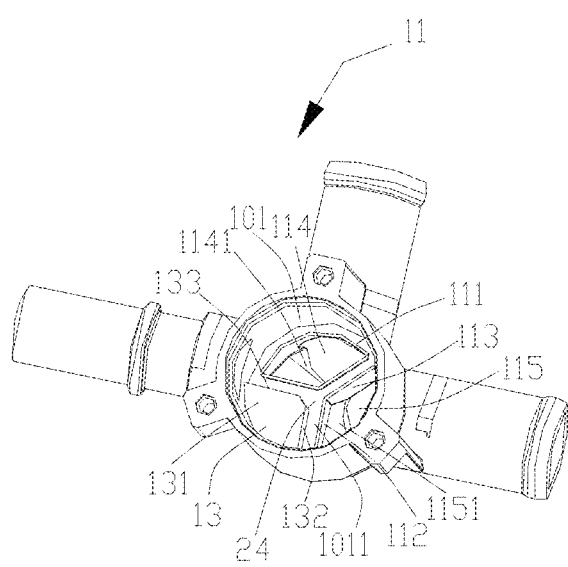
FIG. 4 is a schematic perspective view of a distribution main body of the flow rate control device in FIG. 2.
Figure 5:
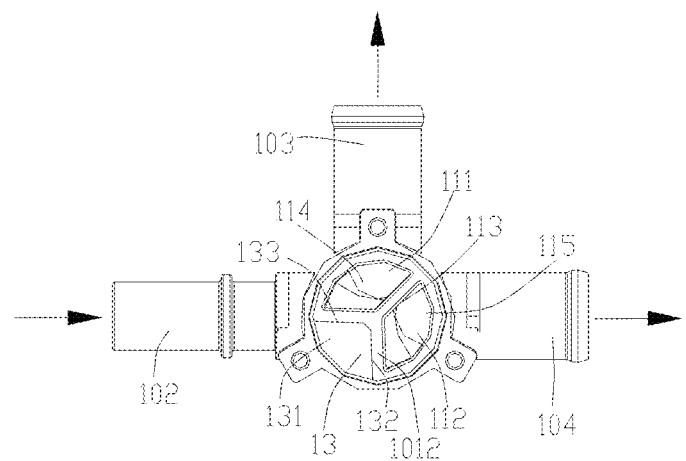
FIG. 5 is a schematic perspective top view of the distribution main body in FIG. 4.
Figure 11:
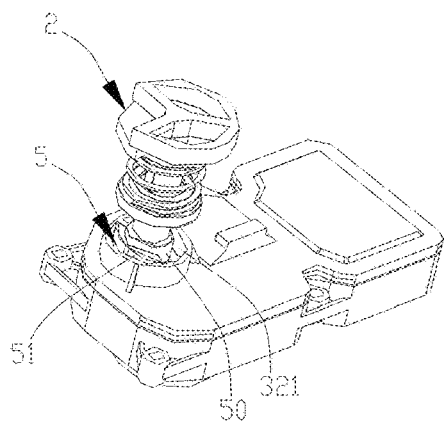
FIG. 11 is a schematic perspective view showing the valve body component in FIG. 6 assembled with the control component.
Figure 12:
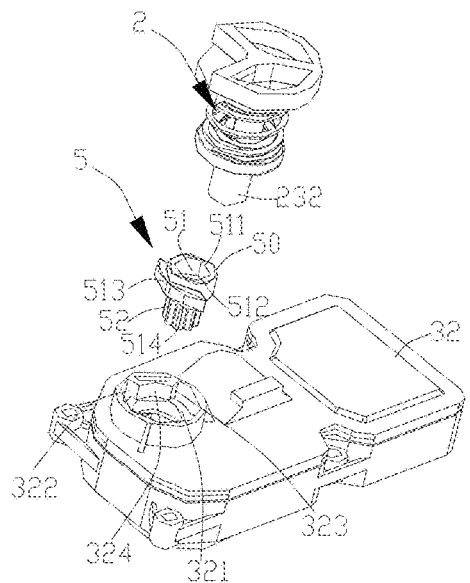
FIG. 12 is a schematic perspective view of the assembly in FIG. 11.
Figure 13:
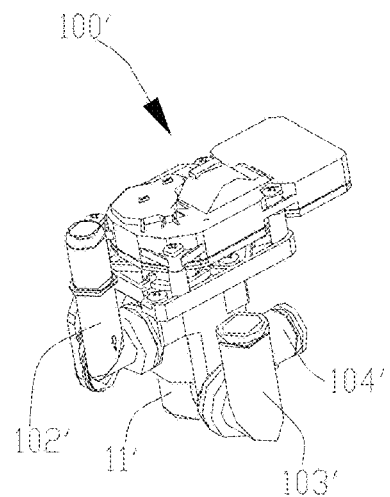
FIG. 13 is a schematic perspective view showing another embodiment of the flow rate control device in an assembled state.
Figure 14:
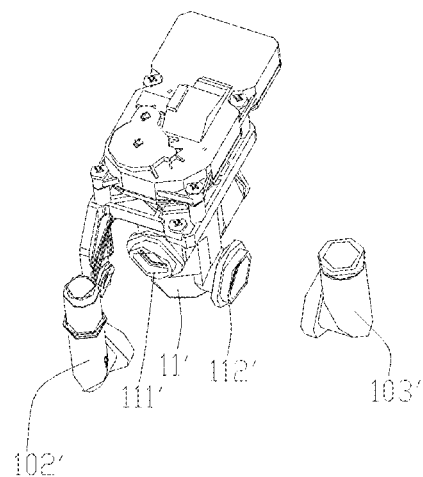
FIG. 14 is a perspective exploded view of the flow rate control device in FIG. 13.
Figure 15:
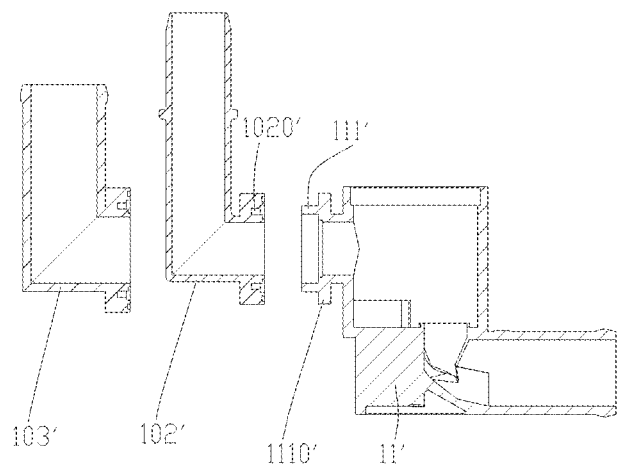
FIG. 15 is a sectional exploded view of a first connection pipe, an inlet pipeline and a first outlet pipeline of the flow rate control device in FIG. 14.
Figure 16:
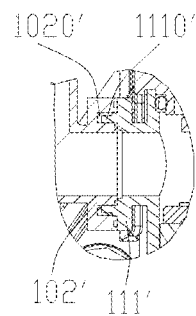
FIG. 16 is a sectional view of the first connection pipe and the inlet pipeline in FIG. 14 in an assembled state.

Referring to FIGS. 3, 7 and 8, one end of the transmission part 23 forms a first transmission portion 231, the first transmission portion is relatively secured to the upper surface of the second valve plate 22, and the upper surface of the second valve plate 22 has a fixing recess 221 for accommodating the first transmission portion. Another end of the transmission part forms a second transmission portion 232, and the second transmission portion 232 is arranged to extend outwardly of the housing. Specifically, the cover body 12 of the housing 1 has a through hole arranged to correspond to the second transmission portion 232. The second transmission portion passes through the through hole to extend outwards. Reference is further made to FIGS. 11 and 12, the flow rate control device further includes an adapter 5, and the adapter 5 is arranged outside of the housing. One end of the adapter is assembled with the second transmission portion 231 to be fixed, and the assembly may be specifically performed through concave and convex structures. Another end of the adapter is assembled with a transmission output portion of the control component 3 to be fixed, and specifically, the assembly can be performed by the internal and external splines which are cooperated. By providing the adapter, the transmission part and the transmission output portion of the control part may be assembled to each other to be relatively fixed, and the controllability of the movement of the transmission part 23 can be improved. Specifically, the adapter 5 includes a main body portion 50, a position-limiting portion 51 and an adapting transmission portion 52. The main body portion 50 and the second transmission portion 232 are assembled to each other to be relatively fixed. The position-limiting portion 51 is arranged to overhang radially from the main body portion 50. The position-limiting portion 51 is arranged on a part of a circumferential side of the central axis of the main body portion, and the adapting transmission portion 52 is mechanically connected to the transmission output portion.

The control component 3 includes a position-limiting recess 321, a first block portion 322, and a second block portion 323. The position-limiting recess can correspondingly accommodate the position-limiting portion 51. Further, the position-limiting recess 321 is formed by extending outwards from a base 32 of a shell of the control component 3. The first block portion 322 and the second block portion 323 are integrally connected with each other and are located at an inner side of the position-limiting recess 321. A guiding side surface 324 is formed by integrally connected between the first block portion 322 and the second block portion 323. A circumferential side of the main body portion 51 of the adapter is relatively pivotally fitted with the guiding side surface 324. The position-limiting portion 51 has at least one guiding curved surface, specifically including a first guiding curved surface 513 and a second guiding curved surface 514. The first guiding curved surface and the second guiding curved surface are relatively pivotally fitted with an inner wall of the position-limiting recess 321. The transmission output portion 31 includes at least two working positions, a first position and a second position. Specifically, the transmission output portion rotates between the first position and the second position. When the transmission output portion 31 is located in the first position, the position-limiting portion 51 abuts against the first block portion 322. When the transmission output portion 31 rotates to the second position, the position-limiting portion 51 abuts against the second block portion 323. When the transmission output portion 31 is located in the first position or the second position, correspondingly, the transmission part 23 drives the second valve plate to open or close the flow valve port. The transmission output portion 31 moves between the first position and the second position, the first valve plate achieves a movement stroke from opening to closing relative to the second valve plate. The flow rate control device further includes a sealing ring 25, the sealing ring is arranged between a circumferential side of the second transmission portion 232 and an inner wall of the through hole 121 of the housing, to prevent leakage of the working medium from the through hole. Specifically, as the transmission output portion 31 of the control component drives the second transmission portion, driven by the second transmission portion 232, the first transmission portion 231 drives the second valve plate 22 to perform a rotating movement relative to the first valve plate 21. Driven by the first transmission portion 231, the second valve plate opens or closes at least one of the first flow port and the second flow port of the first valve plate. When the transmission output portion 31 is located in the first position, the first flow port 211 is opened to the maximum opening degree, and the opening degree of the second flow port 212 is zero. When the transmission output portion rotates to the second position, the opening degree of the first flow port 211 is zero, and the second flow port 212 is opened to the maximum opening degree.

One of the adapter 5 and the second transmission portion 232 has a positioning recess, and the other has a positioning fool-proofing portion. Specifically, the lower end of the main body portion of the adapter 5 is provided with a positioning recess 51. The second transmission portion 232 has the positioning fool-proofing portion 233. In the vertical direction of the transmission part 23, the positioning fool-proofing portion 233 is assembled and relatively secured to the positioning recess 51, and the positioning recess and the positioning fool-proofing portion are formed with an erroneous fitting prevention structure capable of limiting position, and after being assembled, the erroneous fitting prevention structure can also prevent the positioning recess and the positioning fool-proofing portion from being twisted in the circumferential direction. The positioning recess 51 has at least one positioning flat surface 511, the positioning fool-proofing portion has at least one positioning flat surface 2331, and the positioning flat surface of the positioning recess abuts against the positioning flat surface of the positioning fool-proofing portion; and/or, the positioning recess has at least one positioning curved surface 512, and the positioning fool-proofing portion has at least one positioning curved surface 2332, and the positioning curved surface of the positioning recess abuts against the positioning curved surface of the positioning fool-proofing portion.

Referring to FIGS. 6 and 8, the transmission part 23 includes a connection member 234, a transmission member 235 and an elastic element 236. A lower end of the connection member is assembled and secured to the second valve plate, and an upper end of the connection member is assembled and secured to the transmission member. A lower end of the transmission member has an fool-proofing recess, and the fool-proofing recess correspondingly accommodates and fixes the upper end of the connection member. The second transmission portion is formed at an upper end of the transmission member. The upper end of the transmission member extends outwards through the housing to thereby receiving the power output of the control component. Specifically, one of the connection member of the transmission part 23 and the second valve plate is provided with at least two fixing claws 2341, and the other is provided with fixing recesses respectively cooperated with the fixing protrusions, for example, the fixing recesses 221 of the second valve plate. The at least two fixing claws are arranged to be mirror symmetric. Driven by the fixing claws, the second valve plate 22 performs a circumferential rotating movement relative to the first valve plate 21. A lower side of the elastic element 236 is locked on a radial outer side of the fixing claws 2341, and an upper side of the elastic element abuts against the second transmission portion. Further, a lower end of the elastic element 236 is locked onto a rib 2342 on the circumferential side of the connection member 234, and an upper end of the elastic element is locked onto a rib 2351 on the circumferential side of the transmission member 235, so as to allow the elastic element 236 to be fastened and locked onto the main body region of the transmission part 23, to increase the structural strength of the transmission part and also provide the transmission part 23 with an elastic buffer when the transmission part 23 is subjected to an excessive impact by an external force.

Reference is made to FIGS. 13 to 16, which show another embodiment of the flow rate control device, in the embodiment, the housing has a different configuration. The housing 1' has a first pipeline and a second pipeline. The first pipeline is an inlet pipeline 102', and the second pipeline is a first outlet pipeline 103', so as to form a three-way structure with one inlet and one outlet. Of course, a third pipeline may be further provided. The third pipeline is a second outlet pipeline 104', thereby forming a three-way structure with one inlet and two outlets. The inlet pipeline 102', the first outlet pipeline 103' and/or the second outlet pipeline are arranged separate from the distribution main body 11'. Correspondingly, the distribution main body has a first connection pipe 111', a second connection pipe 112' and a third connecting pipeline. The inlet pipeline, the first outlet pipeline, and/or the second outlet pipeline is a straight pipe structure or an elbow pipe structure, such as an L-shaped elbow pipe structure, which can fully utilize the space on the circumferential side of the distribution main body, facilitate occupied space saving. Further, the inlet pipeline 102' and the first connection pipe 111' are assembled and secured and are arranged in a sealed manner. The first outlet pipeline 103' and the second connection pipe 112' are assembled and secured and are arranged in a sealed manner, the two assembled parts are then assembled and welded or are sealed by a sealing element, and can evade the control component arranged at the upper side. Specifically, one of the inlet pipeline and the first connection pipe has a welding convex portion, and the other has a welding concave portion. Specifically, the first connection pipe 111' has a welding convex portion 1110', and the nozzle of the inlet pipeline 102' has a welding concave portion 1020'. Further, the welding convex portion is inserted into the welding concave portion and is secured by welding, such that the inlet pipeline 102' is connected to the first connection pipe 111' by welding so as to be arranged in a sealed manner. Similarly, the first outlet pipeline (or the second outlet pipeline) can also be connected to the second connection pipe 112' by connecting the welding convex portion and the welding concave portion by welding so as to be arranged in a sealed manner. Of course, other embodiments may also be adopted. For example, the flow rate control device further includes a first sealing element and a second sealing element, and the sealing element connects the first outlet pipeline to the first connection pipe in a sealed manner, the sealing element connects the second outlet pipeline and the second connection pipe in a sealed manner. In other embodiments, one or two of the inlet pipeline 102', the first outlet pipeline 103' and the second outlet pipeline may also choose to be integrally connected to the distribution main body, and the other pipelines adopt the separate arrangement described above.

The inner diameter or flow area of the first outlet pipeline 103 is greater or less than or equal to the inner diameter or flow area of the second outlet pipeline 104'. The inner diameter or flow area of the first outlet pipeline 103' is greater or less than or equal to the inner diameter or flow area of the inlet pipeline 102', which can be adjusted according to the flow rate requirements of the outlet pipelines in which the pipelines are located. Thus, when the system flow rate requires to change the inlet flow rate and the outlet flow rates, since the first and second outlet pipelines can be manufactured separately from the distribution main body, it is simply required to change the inner diameter of the inlet and outlet pipelines without changing the structure of the distribution main body.

The manufacturing method for the flow rate control device described in the above embodiments can adopt the following steps.

A distribution main body 11 and a cover body 12 formed by injection molding are provided. The distribution main body and the cover body are assembled by threaded connection, or welded connection or rivet connection. The distribution main body is integrally formed with an inlet pipeline and at least one outlet pipeline, or the distribution main body is integrally formed with a first connection pipe and a second connection pipe, and in this case, an inlet pipeline and at least one outlet pipeline formed by injection molding are provided. The first connection pipe of the distribution main body and the inlet pipeline are arranged in a sealed manner, and the second connection pipe of the distribution main body and the outlet pipeline are arranged in a sealed manner.

A valve body assembly 2 is provided. First, a transmission part 23 formed by injection-molding with a plastic, a first valve plate 21 and a second valve plate 22 made of ceramic or metal are respectively provided. The first valve plate 21 is secured by being assembled to the position-limiting protrusion 13 integrally formed with the distribution main body 11. The second valve plate 22 is relatively secured by being assembled to the transmission part 23.

A control component 3 is provided. The control component is assembled, by providing a base 32 of a shell, to a cover body 12 of the housing by a threaded connection or a welded connection or a rivet connection. The control component 3 is integrally formed with an external fixation frame 33. The external fixation frame includes a fixation hole 331 and a shockproof ring 332 locked inside the fixation hole.

It should be noted that the above embodiments are only intended to illustrate the present application rather than limiting the technical solutions described in the present application. Although the present application has been described in detail with reference to the above-mentioned embodiments, the person skilled in the art should understand that those skilled in the art can still modify or equivalently substitute the present application, and all the technical solutions and improvements that do not depart from the spirit and scope of the present application should be covered by the scope of the claims of the present application.

The invention claimed is:

1. A flow rate control device, comprising:
a housing, and
a valve body assembly,
wherein the housing has a mounting chamber, at least one inlet and at least one outlet, the valve body assembly is at least partially accommodated in the mounting chamber, and the valve body assembly comprises a first valve plate, a second valve plate and a transmission part,
wherein the housing has a position-limiting protrusion and an accommodating portion at a bottom side of the mounting chamber, the first valve plate is at least partially located at the accommodating portion, the position-limiting protrusion limits the position of the first valve plate in a circumferential direction, a lower surface of the second valve plate is arranged at least partially opposite to the position-limiting protrusion, and the lower surface of the second valve plate is in surface contact with an upper surface of the first valve plate in a sealed manner; and
the housing has at least one opening at the bottom side of the mounting chamber, the at least one opening is in communication with the outlet, the first valve plate has at least one flow valve port corresponding to and in communication with the opening of the housing, the second valve plate is relatively securely connected to the transmission part, and under the driving of the transmission part, the second valve plate opens or closes the flow valve port of the first valve plate and/or regulates the opening degree of the flow valve port,
wherein the accommodating portion and the position-limiting protrusion are complementarily arranged in the housing, and in a direction perpendicular to the first valve plate, a lower surface of the first valve plate is lower than an upper surface of the position-limiting protrusion, the upper surface of the first valve plate is higher than or flush with the upper surface of the position-limiting protrusion, and both sides of the position-limiting protrusion are respectively formed with a first block portion and a second block portion, the first valve plate has a first engaging portion and a second engaging portion, the first engaging portion and the first block portion of the position-limiting protrusion are oppositely arranged, and the second engaging portion and the second block portion of the position-limiting protrusion are oppositely arranged, such that the first block portion and the second block portion limit the position of the first valve plate in the circumferential direction,
wherein the first block portion and/or the second block portion of the position-limiting protrusion are arranged opposite to a side edge of the first valve plate, the first block portion and the second block portion are formed at both side edges of the position-limiting protrusion, the side edges of the position-limiting protrusion are arranged to intersect with the upper surface of the position-limiting protrusion, the first valve plate has a fan-shaped main body portion having a fan shape, the main body portion comprises an arc-shaped portion, and the arc-shaped portion, the first engaging portion, and the second engaging portion form the fan-shaped main body portion.

2. The flow rate control device according to claim 1, wherein a clearance fit is formed between the first valve plate and the housing, and a clearance which is less than 2 mm is presented between the first engaging portion and the first block portion of the position-limiting protrusion, and/or a clearance which is less than 2 mm is presented between the second engaging portion and the second block portion.

3. The flow rate control device according to claim 1, wherein the second valve plate is a movable valve plate, the first valve plate is a relatively secured valve plate relative to the second valve plate, the second valve plate is configured to rotate along the upper surface of the first valve plate, the lower surface of the second valve plate has a roughness smaller than or equal to the roughness of an upper surface of the second valve plate, and the upper surface of the first valve plate has a roughness smaller than or equal to the roughness of the lower surface of the first valve plate, and wherein a clearance fit is formed between the first valve plate and the housing, and a clearance which is less than 2 mm is presented between the first engaging portion and the first block portion of the position-limiting protrusion, and/or a clearance which is less than 2 mm is presented between the second engaging portion and the second block portion.

4. The flow rate control device according to claim 3, wherein the roughness of the upper surface of the first valve plate is greater than 0.03 μm and smaller than 0.48 μm, and/or the roughness of the lower surface of the second valve plate is greater than 0.03 μm and smaller than 0.48 μm.

5. The flow rate control device according to claim 1, wherein the opening of the housing comprises a first opening and a second opening at the bottom side of the mounting chamber, and the housing has a first outlet and a second outlet, the first outlet is in communication with the first opening, and the second outlet is in communication with the second opening; and the flow valve port of the first valve plate comprises a first flow port corresponding to and in communication with the first opening and a second flow port corresponding to and in communication with the second opening, the first valve plate has a partition, wherein the partition is integrally connected to an inner side of the fan-shaped main body portion, such that the first flow port and the second flow port are formed at both sides of the partition, the flow rate control device has a flow channel via which the inlet is in communication with at least one of the first outlet and the second outlet; and
the second valve plate is a movable valve plate, the first valve plate serves as a relatively secured valve plate relative to the second valve plate, and the second valve plate is rotatable along the upper surface of the first valve plate, the second valve plate comprises a first position and a second position, and when the second valve plate is at the first position, the second valve plate opens the first flow port such that the first outlet conducts, and closes the second flow port such that the second outlet is cut off, and when the second valve plate is at the second position, the second valve plate opens the second flow port such that the second outlet conducts, and closes the first flow port such that the first outlet is cut off.

6. The flow rate control device according to claim 5, wherein when the second valve plate reaches the first position, the first flow port is opened to a maximum opening degree and the opening degree of the second flow port is zero, and when the second valve plate reaches the second position, the opening degree of the first flow port is zero and the second flow port is opened to a maximum opening degree, and when the second valve plate moves to a position between the first position and the second position, both the first port and the second flow port are opened, and the sum of the opening degree of the first flow port and the opening degree of the second flow port is equal to the maximum flow opening degree of the first flow port or the maximum flow opening degree of the second flow port.

7. The flow rate control device according to claim 6, wherein the accommodating portion comprises a fan-shaped region, and the housing comprises a dividing portion, a first distribution chamber and a second distribution chamber, the dividing portion integrally extends from a bottom side of the housing, the dividing portion is integrally connected to the position-limiting protrusion, the upper surface of the position-limiting protrusion is higher than an upper surface of the dividing portion, the first distribution chamber and the second distribution chamber are respectively located at both sides of the dividing portion, wherein the first opening of the housing is in communication with the first distribution chamber, and the second opening is in communication with the second distribution chamber, a first flow guiding portion is formed at a bottom side of the first distribution chamber, and the first flow guiding portion has an arc-shaped connection surface connected to a side wall surface of the of the dividing portion, and/or a second flow guiding portion is formed at a bottom side of the second distribution chamber, and a second flow guiding portion has an arc-shaped connection surface connected to another side wall surface of the dividing portion.

8. The flow rate control device according to claim 5, wherein the first opening and the second opening of the housing are each of a fan shape or a crescent shape or a kidney shape, and the flow rate control device further comprises a substantially fan-shaped sealing member, and the first valve plate and the housing are sealed against each other by the sealing member, and the sealing member is in contact with the lower surface of the first valve plate, and in a vertical direction perpendicular to the first valve plate, the sealing member is sandwiched between the lower surface of the first valve plate and the housing, the housing has a positioning groove for accommodating the sealing member, and the positioning groove is arranged to correspond to the sealing member, and the lower surface of the second valve plate is arranged to at least partially be opposite to the upper surface of the position-limiting protrusion, and in a direction perpendicular to the second valve plate, a clearance is presented between the lower surface of the second valve plate and the upper surface of the position-limiting protrusion, and the clearance is not greater than the thickness dimension of the first valve plate.

9. The flow rate control device according to claim 1, wherein the first valve plate and the second valve plate are ceramic valve plates or metal valve plates, and the second valve plate comprises a fan-shaped opening, and the fan-shaped opening is in communication with the flow valve port of the first valve plate, the second valve plate opens the first flow port and/or a second flow port of the first valve plate, and the fan-shaped opening is in communication with the first flow port and/or the second flow port, the opening of the first flow port is configured to communicate the inlet of the housing with a first outlet, and the opening of the second flow port is configured to communicate the inlet with a second outlet, the transmission part is configured to control the second valve plate to perform a rotating movement relative to the first valve plate, thereby regulating proportions of flow rates of a fluid flowing from the inlet to the first outlet and the second outlet.

10. The flow rate control device according to claim 5, wherein the flow rate control device further comprises a control component, the control component provides a driving force to drive the transmission part to move, and the transmission part drives the second valve plate, the transmission part and the housing are arranged to be sealed against each other, and the upper surface of the first valve plate is in contact with the lower surface of the second valve plate.

11. The flow rate control device according to claim 1, further comprising a control component, wherein the housing comprises a distribution main body, a cover body, a first pipeline and a second pipeline, the first pipeline and the second pipeline are connected to the distribution main body, and the first pipeline and the second pipeline are arranged to be sealed against the distribution main body, wherein, one of the first pipeline and the second pipeline is an inlet pipeline, and the other is an outlet pipeline, wherein the outlet pipeline is connected to and communicates with the opening of the housing; wherein the mounting chamber comprises an accommodating recess located on one side of the position-limiting protrusion, the first valve plate is located in the accommodating recess, the first valve plate and the position-limiting protrusion are substantially complementarily arranged, thereby the first valve plate is relatively securely positioned relative to the position-limiting protrusion, a lower surface of the second valve plate is arranged opposite to the position-limiting protrusion, and the lower surface of the second valve plate is in direct contact with the first valve plate.

12. The flow rate control device according to claim 11, wherein the first pipeline and the second pipeline are assembled and connected to the distribution main body, the distribution main body has a first connection pipe and a second connection pipe, wherein the flow rate control device comprises at least a first sealing element and a second sealing element, and the first sealing element connects the first pipeline to the first connection pipe in a sealed manner, and the second sealing element connects the second pipeline to the second connection pipe in a sealed manner, or, the first pipeline and the first connection pipe are connected in a sealed manner by welding, one of the first pipeline and the first connection pipe has a welding convex portion, and the other has a welding concave portion, and the welding convex portion is inserted into the welding concave portion and is secured by welding, and the second pipeline and the second connection pipe are connected in a sealed manner by welding, one of the second pipeline and the second connection pipe has a welding convex portion, and the other has a welding concave portion, and the welding convex portion is inserted into the welding concave portion and is secured by welding, wherein the first valve plate has the fan-shaped main body portion and a partition, wherein the partition is integrally connected to the fan-shaped main body portion, and a first flow port and a second flow port are formed at both sides of the partition, the flow rate control device has a flow channel via which the inlet pipeline is in communication with the outlet pipeline; and one of the transmission part and the second valve plate is provided with at least two fixing claws, and the other is provided with fixing recesses that respectively cooperate with the fixing protrusions, and the at least two fixing claws are arranged to be mirror symmetric, and driven by the fixing claws, the second valve plate performs a circumferential rotating movement relative to the first valve plate.

13. The flow rate control device according to claim 12, wherein the housing further comprises a third pipeline that is integrally formed with the distribution main body or assembled and secured to the distribution main body in a sealed manner or secured to the distribution main body by welding, and the third pipeline serves as another outlet pipeline; the inlet pipeline, the first outlet pipeline and/or the second outlet pipeline is a straight pipe structure or an elbow pipe structure; an inner diameter or flow area of the first pipeline or the third pipeline is greater than or less than or equal to an inner diameter or flow area of the second pipeline, which can be adjusted depending on flow rate requirements of respective outlet pipelines where the first pipeline, the second pipeline and the third pipeline are located.

14. A flow rate control device, comprising a housing, a valve body assembly and a control component, wherein the housing has a mounting chamber, an inlet, at least one outlet, the valve body assembly comprises a first valve plate, a second valve plate, and a transmission part, the first valve plate and the second valve plate are accommodated in the mounting chamber, a lower side of the second valve plate is in direct contact with the first valve plate, one end of the transmission part forms a first transmission portion, the first transmission portion is assembled and secured to an upper side of the second valve plate, the upper side of the second valve plate has a fixing recess configured to accommodate the first transmission portion, and another end of the transmission part forms a second transmission portion, and the second transmission portion is arranged to extend outward of the housing, the flow rate control device further comprises an adapter, and the adapter has one end assembled and secured to the second transmission portion, and another end assembled and secured to a transmission output portion of the control component,
wherein the housing has a through hole corresponding to the second transmission portion, and the second transmission portion extends outwards through the through hole, the adapter is arranged outside the housing, the adapter comprises a position-limiting portion, and the control component comprises a position-limiting recess arranged to correspond to the position-limiting portion, a first block portion and a second block portion, the position-limiting recess accommodates the position-limiting portion of the adapter, and the transmission output portion comprises a first position and a second position, and when the transmission output portion is located at the first position, the position-limiting portion abuts against the first block portion, and when the transmission output portion rotates to the second position, the position-limiting portion abuts against the second block portion,
wherein the adapter further comprises a main body portion and an adapting transmission portion, wherein the main body portion is mechanically connected to the second transmission portion, and the adapting transmission portion is mechanically connected to the transmission output portion of the control component, the position-limiting portion is arranged to overhang radially from the main body portion, and the position-limiting portion is arranged on a part of a circumferential side of the main body portion,
wherein the position-limiting recess is formed by protruding outwards from a base of a shell of the control component, and the first block portion and the second block portion are located at an inner side of the position-limiting recess and are an integrally connected structure, and a guiding side surface is formed by integrally connected between the first block portion and the second block portion, and a circumferential side of the main body portion of the adapter is relatively pivotally fitted with the guiding side surface, the position-limiting portion has at least one guiding curved surface, and the guiding curved surface is relatively pivotally cooperated with an inner wall of the position-limiting recess.

15. The flow rate control device according to claim 14, wherein one of the adapter and the second transmission portion has a positioning recess and the other has a positioning fool-proofing portion, and in an axial direction of the transmission part, the positioning fool-proofing portion is assembled and relatively secured to the positioning recess, and the positioning recess and the positioning fool-proofing portion comprises an erroneous fitting prevention structure for limiting position.

16. The flow rate control device according to claim 15, wherein the positioning recess has at least one positioning flat surface, the positioning fool-proofing portion has at least one positioning flat surface, and the positioning flat surface of the positioning recess abuts against the positioning flat surface of the positioning fool-proofing portion.

17. The flow rate control device according to claim 15, wherein the positioning recess has at least one positioning curved surface, and the positioning fool-proofing portion has at least one positioning curved surface, the positioning curved surface of the positioning recess abuts against the positioning curved surface of the positioning fool-proofing portion, the transmission part comprises a connection member and a transmission member, and a lower end of the connection member is assembled and secured to the second valve plate, and an upper end of the connection member is assembled and secured to the transmission member, wherein a lower end of the transmission member has an fool-proofing recess, and the fool-proofing recess correspondingly accommodates and secures the upper end of the connection member, and the second transmission portion is formed at an upper end of the transmission member, and the upper end of the transmission member extends outwards through the housing.

\* \* \* \* \*